United States Patent
Dobler et al.

[11] Patent Number: 5,975,729
[45] Date of Patent: Nov. 2, 1999

[54] ILLUMINATION DEVICE ARRANGED ON FRONT PART OF VEHICLE

[75] Inventors: Karl-Otto Dobler, Reutlingen; Jan Fischer, Tübingen, both of Germany

[73] Assignee: Robert Bosch GmbH, Stuttgart, Germany

[21] Appl. No.: 08/654,272

[22] Filed: May 28, 1996

[30] Foreign Application Priority Data

May 30, 1995 [DE] Germany ............................ 195 19 655

[51] Int. Cl.⁶ .................................................. B60Q 1/00
[52] U.S. Cl. ............................................ 362/507; 362/517
[58] Field of Search ........................................ 362/61, 80

[56] References Cited

U.S. PATENT DOCUMENTS

| | | | |
|---|---|---|---|
| 4,047,018 | 9/1977 | Harris .................................. | 240/7.1 R |
| 5,327,330 | 7/1994 | Van Oel et al. ........................ | 362/61 |
| 5,343,370 | 8/1994 | Ohashi et al. .......................... | 362/61 |
| 5,398,172 | 3/1995 | Kojima et al. .......................... | 362/61 |
| 5,461,553 | 10/1995 | Neumann et al. ...................... | 362/305 |
| 5,560,706 | 10/1996 | Yamazaki et al. ..................... | 362/267 |

FOREIGN PATENT DOCUMENTS

| | | |
|---|---|---|
| 2 068 590 | 8/1971 | France . |
| 3030427 | 3/1982 | Germany . |
| 41 25 478 A1 | 2/1993 | Germany . |

*Primary Examiner*—Ira S. Lazarus
*Assistant Examiner*—Nhat-Hang H. Lam
*Attorney, Agent, or Firm*—Michael J. Striker

[57] ABSTRACT

An illumination device arrangeable on a front part of a vehicle has a tubular receptacle formed on the front part, a light-permeable cover member covering a light outlet opening, a cup-shaped housing, at least one reflector provided with at least one light source and supported on the housing, the housing being mountable on the receptacle, the cover member being mountable on the front part, the housing having a front edge region facing a light outlet direction and being mountable with the front edge region on a rear-side edge region of the receptacle—facing opposite to the light outlet direction, the cover member, the receptacle and the housing together limiting a closed inner chamber in which the at least one reflector with the at least one light source is arranged.

10 Claims, 2 Drawing Sheets

ILLUMINATION DEVICE ARRANGED ON FRONT PART OF VEHICLE

BACKGROUND OF THE INVENTION

The present invention relates to an illumination device which is arranged on a front part of a vehicle.

Illumination devices of the above-mentioned general type are known in the art. One of such illumination devices is disclosed for example in the German patent document DE 30 30 427 A1. The front part of the vehicle has a tubus-shaped receptacle for the illumination device. The illumination device has a wide outlet opening which is covered by a light permeable cover member. The illumination device further has a cup-shaped housing which accommodates a reflector with a light source and is mountable in the receptacle of the front part. The cover member is mounted on the housing of the illumination device. The cover member with the housing limit a closed inner chamber in which the reflector with the light source is arranged. The illumination device therefore forms a complete sealed unit which is mounted in the receptacle. This leads to a high weight of the front part with the illumination device mounted in it and a great material use both for the receptacle as well as for the housing of the illumination device, since the receptacle additionally surrounds the housing.

SUMMARY OF THE INVENTION

Accordingly, it is an object of the present invention to provide an illumination device arranged in a front part of a vehicle, which avoids the disadvantages of the prior art.

In keeping with these objects and with others which will become apparent hereinafter, one feature of the present invention resides, briefly stated, in an illumination device in which the cover member is mountable on the front part, the housing is mountable with its edge region facing the light outlet direction on a rear region of the receptacle facing opposite to the light outlet direction, the cover member, the receptacle and the housing form together a closed inner chamber in which at least one reflector with at least one light source is arranged.

When the illumination device is designed in accordance with the present invention, it has the advantage that the weight of the front part with the illumination device arranged on it is reduced, since the receptacle of the front part directly adjoins the closed inner chamber, whereby also a lower material use for the housing of the illumination device is needed.

In accordance with another feature of the present invention, the illumination device includes at least one headlight and at least one light, at least one reflector with at least one light source on the housing is associated with the headlight, and the housing has a one-piece further reflector with a further light source for the light. In this construction, additionally a light is integrated in the illumination device.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
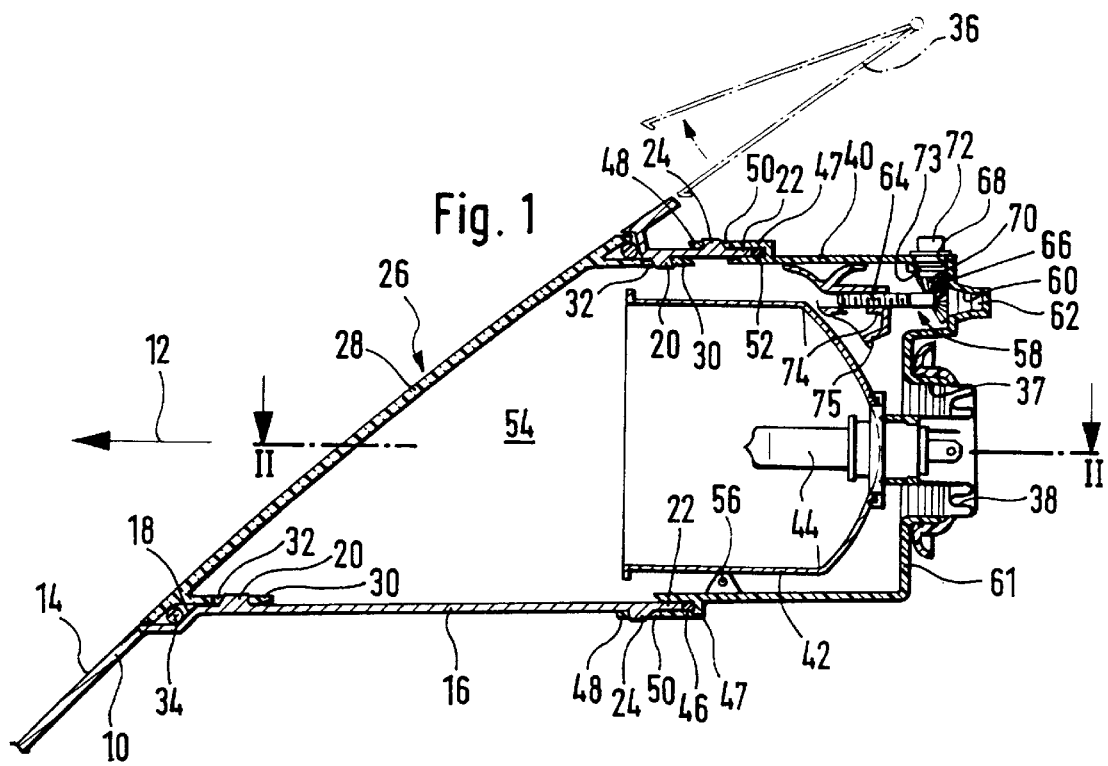
FIG. 1 is a view showing a longitudinal section of an illumination device arranged in a front part of a vehicle in accordance with a first embodiment of the present invention.
Figure 2:
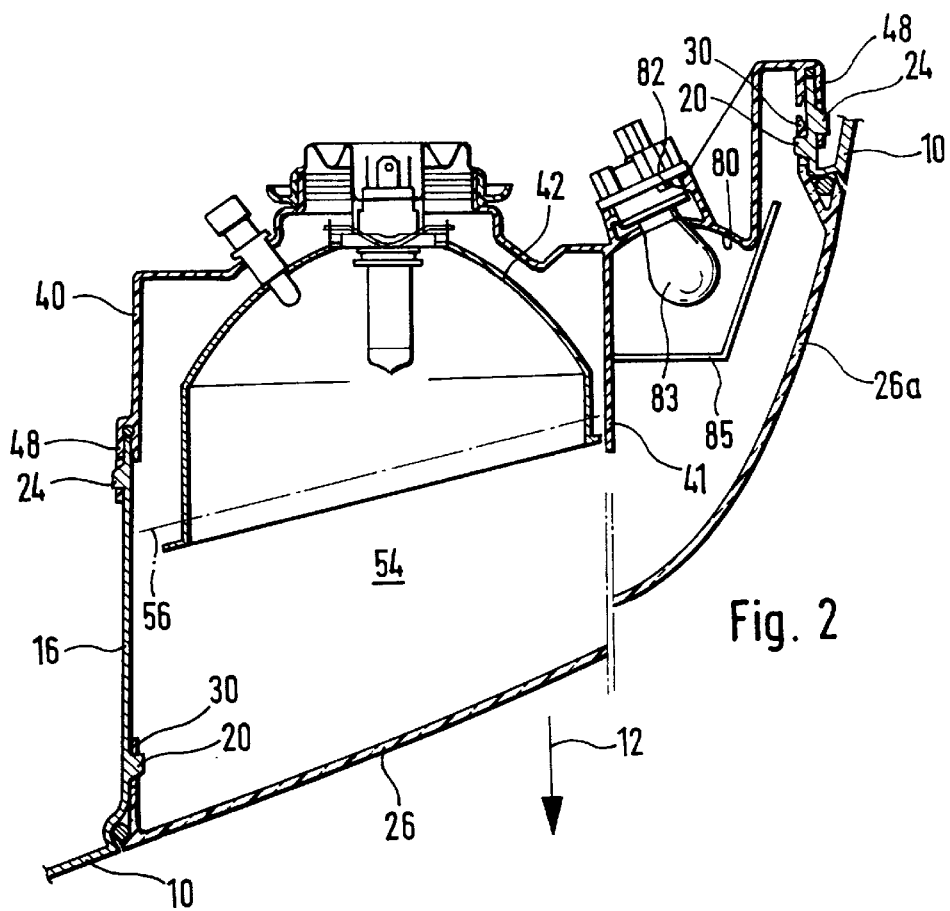
FIG. 2 is a view showing the illumination device in a horizontal longitudinal section taken along the line II—II in FIG. 1.
Figure 3:
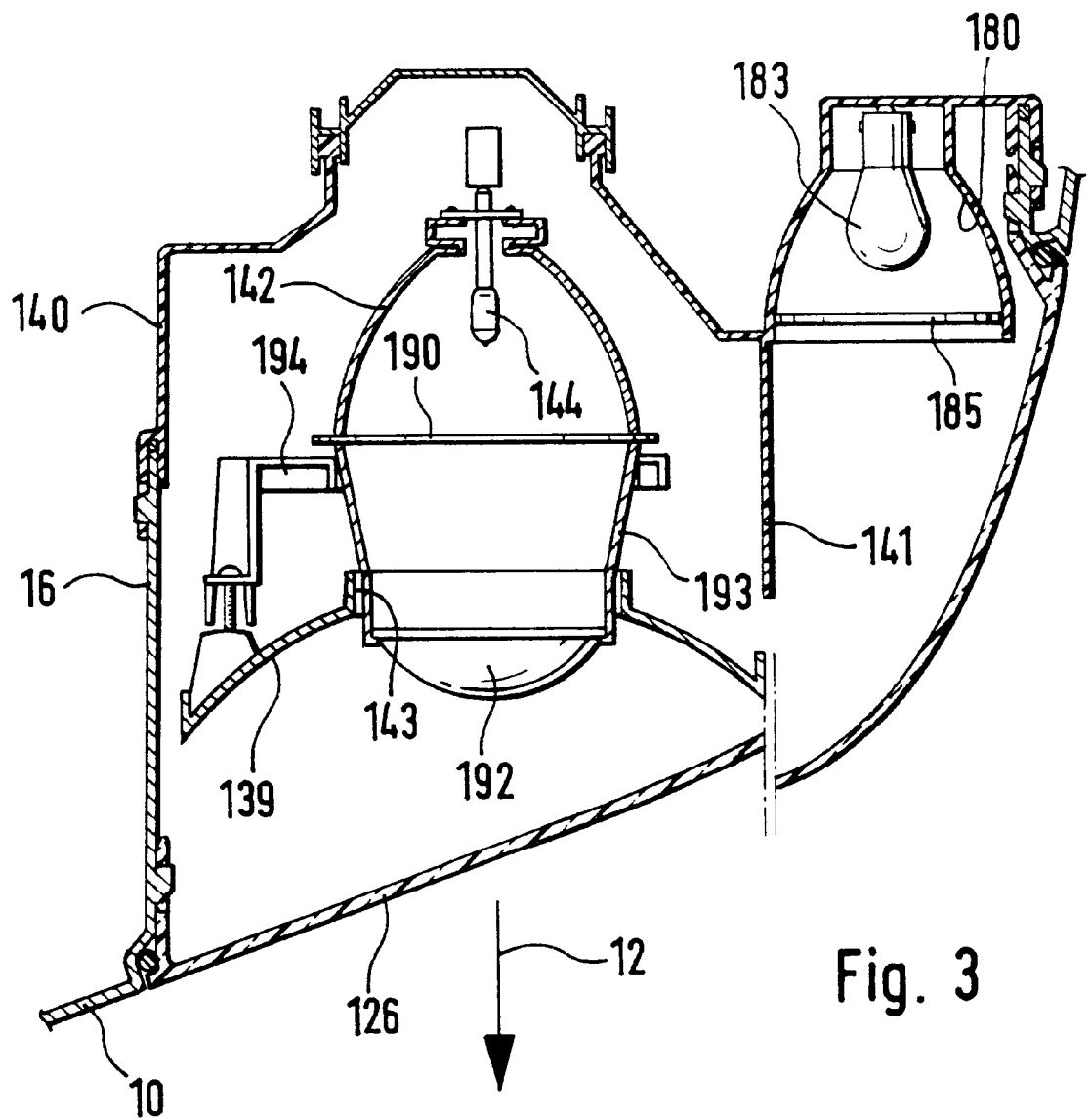
FIG. 3 is a horizontal longitudinal section of the illumination device in accordance with a certain embodiment of the present invention.

In FIGS. 1–3, a front part of a vehicle is identified with reference numeral 10. It has an end side facing the traveling direction 12 and formed so that it raises for example inclinedly opposite to the traveling direction 12. The front part 10 can be composed of synthetic plastic or metal, for example metal cast. The front part 10 has at least one opening in its end side 14. A tubus-shaped receptacle 16 is formed on the front part 10 and projects opposite to the traveling direction 12. It is provided for arranging an illumination device in accordance with the present invention. The front part 10 in each of its lateral edge regions is provided for example with a receptacle 16 which is formed as will be explained with respect to two embodiments of the receptacle.

The front part 10 surrounds the receptacle 16 and has a circumferential edge region 18 which faces in the traveling direction 12 and is somewhat offset back relative to the end side 14 of the front part 10 opposite to the traveling direction 12. Several engaging projections 20 extend inwardly from the inner periphery of the receptacle 16 so that they are distributed over the periphery and located close the edge region 18. Several projections 24 extend outwardly from the outer periphery of the receptacle 16 so that they are distributed over the periphery and located near the rear edge 22 facing opposite to the traveling direction 12. The opening of the receptacle 16 which forms a light outlet opening of the illumination device is covered with a light-permeable cover member 26. The cover member 26 is composed of synthetic plastic, for example elastic synthetic plastic. It can be formed smooth or provided with optically active elements on an inner side facing opposite to the traveling direction 12, for deviating the light coming from the illumination device. The cover member 26 has a main region 28 which overlaps the opening of the receptacle 16 and is arranged flush with the end side 14 of the front part 10. Therefore the main region 28 of the cover member 26 extends the contour of the end part 14 of the front part 10 in the region of the opening of the receptacle 16 continuously, or in other words without steps and without substantial gaps.

Several springy deformable arms 30 project from the main region 28 of the cover member 26 and are distributed over its periphery so as to engage in the receptacle 16. The arms 30 have each an opening 32, in which a respective one of inwardly projecting arresting projections 20 of the receptacle 16 engages. Thereby the cover member 26 is arrestingly held on the front part 10. A circumferential elastic sealing element 34 is arranged between the edge region 18 of the receptacle 16 and the edge of the main region 28 extending over the arm 30. The sealing element is elastically compressed with the cover member 26, is mounted on the front part 10 and seals the receptacle 16 from the front in the traveling direction 12. The cover member 26 is inserted with its arms 30 into the receptacle 16 during its mounting opposite to the traveling direction 12. Thereby the arms 30 are turned springy inwardly until in the end position of the cover member 26, the arresting projections 20 of the receptacle 16 engage in the openings 32 of the arms 30. The arresting projections 20 are inclined inwardly with their edges facing in the traveling direction 12, so that the arms 30 can slightly slide on them. Alternatively, the cover member 26 can be also tightly glued on the edge region 18 of the receptacle 16, so that the sealing element 34 can be dispensed with.

The illumination device has a cup-shaped housing 40 which is open in the traveling direction 12 and composed for example of synthetic plastic. However, it can be formed of a different material such as metal. At least one reflector 42 is supported in the housing 40, and at least one light source 44 is inserted in the reflector 42. The light source 44 can be formed as an incandescent lamp or a gas-discharge lamp. It is inserted in an opening and arranged in the apex region of the reflector 42. The housing 40 has walls which surround the reflector 42 which extend from a rear wall of the housing 40 not completely in the traveling direction 12 to the front edge of the reflector 42. The housing 40 has a front edge which faces in the traveling direction 12 and is provided with a flange with a circumferential groove 46 which is open in the traveling direction 12. The traveling direction 12 is identical with the light outlet direction of the illumination device. Several arms 48 extend from the wall 47 which limits the nut 46 on the outer periphery of the housing 40. They extend in the traveling direction 12 over the periphery of the housing 40. The arms 48 are outwardly turnable in a springy fashion transversely to the traveling direction 12 and are each provided with an opening 50. An elastic sealing element 52 is inserted in the groove 46.

The housing 40 of the illumination device is arrestingly mountable on the rear-side edge 22 of the receptacle 16 by insertion in the traveling direction 12 from the rear side of the receptacle 16. The arms 48 slide during insertion on the outwardly projecting arresting projections 24 of the receptacle 16 and turn outwardly in a springy fashion. The rear-side edge 22 of the receptacle 16 is inserted in the nut 46 and compresses the sealing element 52 so as to elastically deform the latter. In the end position of the housing 40, the arresting projections 24 engage in the openings 50 of the arm 48, so that the housing 40 is held on the receptacle 16, and the reflector 42 is inserted with its front edge into the receptacle 16. The cover member 26, the receptacle 16 and the housing 40 together limit an inner chamber 54 which is sealed by the sealing element 34 and 52. Therefore, the reflector 42 with the light source 44 is protected from dirt and moisture.

The reflector 42 is supported in the housing 40 turnably at least about a horizontal axis 56, which is arranged for example near the lower edge region of the reflector 42. An adjusting device is provided for adjustment of the reflector 42 and has an adjusting screw 58. The adjusting screw 58 has a pin 62 which is rotatably supported in a blind hole 60 arranged in a rear wall 61 of the housing 40 and open in the traveling direction 12. The adjusting screw 58 further has a threaded shaft which faces in the traveling direction 12. The adjusting screw 58 is arranged substantially horizontally and forms a bevel gear 66 which faces with its teeth in the traveling direction 12 and is formed on the transition from the pin 62 to the threaded shaft 64. The housing has an opening 68 provided on its upper side and offset relative to the bevel gear 66 of the adjusting screw 58 in the traveling direction 12. A bevel gear 70 is inserted from above into the opening 68 and extends with its teeth into the housing 40 so as to engage with the teeth of the bevel gear 66 of the adjusting screw 58.

The bevel gear 70 is arranged substantially perpendicular to the adjusting screw 58 and has an actuating portion 72 located outside of the housing 40. The actuating portion 72 is formed for example as an outer hexagon or an inner hexagon and can be also formed as a transverse or intersecting slot, so that a suitable tool can engage the actuating portion. The bevel gear 70 is provided with a safety element 73 which is fitted on its portion extending in the housing 40 and formed for example as a safety ring to prevent a withdrawal of the bevel gear. The threaded shaft 64 of the adjusting screw 58 is screwed in a nut part 74 which is formed on the adjusting element 75 mounted on the reflector 42. The adjusting element 75 is arranged so that it does not displace in the housing 40 in the longitudinal direction of the adjusting screw 58 but is rotatable. The nut part 74 can be arranged directly on the reflector 42 or made of one piece with it. During a rotation of the bevel gear 70, the adjusting screw 58 is rotated correspondingly, and because of its thread connection with the nut part 74, the nut part 74 and through it the reflector 42 is turned on its upper edge region around the axis 56 so as to adjust the orientation of the light beam reflected by the reflector 42 in a vertical direction. The reflector 42 can be additionally supported in the housing 40 turnable about a vertical axis. For turning the reflector 42 about the vertical axis, a further adjusting device can be provided with an adjusting element which is accessible from outside of the housing 40.

In the first embodiment shown in FIGS. 1 and 2 the illumination device is formed as a headlight which has at least one reflector 42 and at least one light source 44. The headlight is formed as a so-called reflection headlight, in which the light emitted by the light source 34 is reflected by the reflector 42 and after passage through the cover member 26 forms a light beam which illuminates the roadway in front of the vehicle. The shape of the reflector 42 can be selected to reflect the light emitted by the light source 44 so as to provide an efficient illumination of the roadway as required, and the cover member 26 can have no effective optical element or only weakly effective optical elements. Alternatively, the reflector 42 can have a simple shape, for example a parabolic shape, and the light reflected by the reflector 42 can be deviated by the optically effective elements of the cover member 26 so as to provide an efficient illumination of the roadway. The headlight can be formed as a pure low beam headlight, or as a headlight for combined low beam and high beam. The light source can be provided with a light body for producing the low beam and for producing the high beam, and the reflector 42 can be provided with an upper region for producing the low beam and a lower region for producing the high beam.

The illumination device, in addition to the headlight, can be also provided with an additional light, for example a blinking light. For this light, a reflector 80 is formed of one piece with the housing 40 and arranged laterally near the reflector 42 for the headlight. For forming the reflector 80 for the light, the housing 40 has a portion with a concavely curved rear wall which is reflectively coated. An opening 82 is provided in the apex of the concavely curved rear wall of the reflector 80, and a light source 83 for the light is inserted in the opening from the rear side of the housing 40. The reflector 80 for the light is surrounded, as the reflector 42 for the headlight, by a flange of the housing 40. It extends in the receptacle 16 and is arranged in a closed inner chamber 54 which is limited by the cover member 26, the receptacle 16 and the housing 40. The housing 40 has an intermediate wall 41 located between the reflector 42 and the reflector 80. Thereby the light emitted by the light source 44 of the reflector cannot impinge on the light reflector 80, and vice versa. The light emitted by the light source 83 of the light cannot impinge on the reflector 42 of the headlight.

The light emitted by the light source 83 and the light reflector 80 passes through the cover member 26 similarly to the light reflected by the reflector 42 of the headlight. Alternatively, the light outlet opening of the receptacle 16 can be covered with two cover members, so that one cover member is associated with the headlight and another cover member is associated with the light. The cover member 26 is formed as continuously colorless, and a color filter is arranged between the light reflector 80 and the color filter 85. The light emitted by the light source 83 and/or the light reflected by the light reflector 80 passes through the color filter 85 and the required signal color is produced for the light. Alternatively, a colored light source 83 can be utilized or the cover member 23 can be colored in a corresponding color in the region 26A through which the light reflected from the light reflector 80 passes.

The housing 40 together with the reflector 42 arranged on it form a premounting structural unit which is mounted from the rear side of the receptacle 16. This mounting unit can be mounted and dismounted in a simple manner. The housing 40 has an opening 37 provided on its rear side, through which the light source 44 is mountable and dismountable and which is closable by a cap 38. In order to exchange the light source 44 of the headlight or the light source 83 of the light, either the illumination device is accessible from its rear side on the vehicle or the front part is removed from the vehicle. A movable flap 36 can be arranged above the receptacle 16 on the end side 14 of the front part 10 and can be turnable on the front part 10. With the turned back flap 36, the actuating portion 72 of the bevel gear 70 becomes accessible, so that an adjustment of the orientation of the reflector 42 is possible.

The illumination device in accordance with a second embodiment is shown in FIG. 3. As in the first embodiment, it has a headlight and also a light arranged laterally near the headlight. The headlight includes a low beam headlight in accordance with a projection principle and a low beam headlight in accordance with the reflection principle. The low beam headlight has a reflector 142 with a light source 144. A shutter 190 is arranged in the path of rays of the light reflected by the reflector 142, and a lens 192 is arranged after the shutter 190 in the light outlet direction and held in a support 193 connected with the front edge of the reflector 142. The reflector 142 has such a shape that the light emitted by the light source 144 is reflected by the reflector as a converting light beam. The shutter 190 produces an upper bright-dark limit of the low beam, and the lens 192 deviates the light bundle so that an efficient illumination of the roadway in front of the vehicle is provided. The cover member 126 does not have to provide any optical action. However, it can be provided with optically effective elements, for example for a horizontal dissipation of the passing light.

The low beam headlight is connected with the high beam headlight which has a reflector 139 provided with a recess 143 for passage of the lens 192 of the low beam headlight in the traveling direction 12. The reflector 139 of the high beam headlight is arranged underneath and laterally near the lens 192 of the low beam headlight, and a not shown light source is inserted in it below the lens 192. The reflector 139 of the high beam headlight can have a parabolic shape or any other shape, and the cover member 126 can be provided with optically effective elements for deviating the light reflected from the high beam reflector 139 to produce a high beam illuminating efficiently the roadway in front of the vehicle.

The reflector 139 of the high beam reflector is connected with the low beam headlight unit which is composed of the reflector 142, the shutter 190, the lens 192 and the support 193. The connection can be performed through a frame 194 which surrounds the support 193 so as to form a unit with it, which unit is adjustably supported in the housing 140. The adjusting device for this unit can be formed as described in the first embodiment. A reflector 180 for a light is formed of one piece with the housing 140 in a region arranged laterally near the headlight, and a light source 183 is inserted in the light. The light reflector 180, as in the first embodiment, is separated by an intermediate wall 141 from the headlight, and the high beam reflector 139 extends in the lateral direction toward the light substantially to the intermediate wall 141. A color filter 185 is arranged between the reflector 180 for the light and the cover member 126 and colored in the required signal color for the light. The construction of the receptacle 16 and the housing 140 of the illumination device as well as the cover member 126 and its mounting is described with respect to the first embodiment. The housing 140 of the illumination device in accordance with the second embodiment preferably has the same dimensions as the housing 40 of the illumination device of the first embodiment, so that they can be mounted selectively on the identically formed front part and exchanged when necessary.

It will be understood that each of the elements described above, or two or more together, may also find a useful application in other types of constructions differing from the types described above.

While the invention has been illustrated and described as embodied in an illumination device arranged on the front part of a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An illumination device arrangeable on a front part of a vehicle, comprising a tubular receptacle formed on the front part of the vehicle; a light-permeable cover member covering a light outlet opening; a cup-shaped housing; at least one reflector provided with at least one light source and supported on said housing, said housing being mountable on said receptacle of the front part of the vehicle, said cover member being mountable on the front part of the vehicle, said housing having a front edge region facing a light outlet direction and being mountable with said front edge region on a rear-side edge region of said receptacle facing opposite to the light outlet direction, said cover member, said receptacle of the vehicle and said housing together limiting a closed inner chamber in which said at least one reflector with said at least one light source is arranged.

2. An illumination device as defined in claim 1, wherein said housing is arrestingly mountable on said rear-side edge of said receptacle; and further comprising means for arrestingly mounting said housing on said rear-side edge of said receptacle.

3. An illumination device as defined in claim 2, wherein said arresting means include a plurality of outwardly extending arresting projections which are provided on said receptacle and distributed over a periphery of said receptacle, and a plurality of springy arms having recesses and provided on said housing so as to be distributed over a periphery of said housing, said arresting projections being arrestable in said recesses.

4. An illumination device as defined in claim 1, wherein said front edge of said housing has a peripheral groove; and further comprising an elastic sealing element arranged in said peripheral groove, said rear-side edge of said receptacle engaging in said groove when said housing is mounted on said receptacle so as to elastically compress said sealing element.

5. An illumination device as defined in claim 1; and further comprising at least one headlight and at least one light, said at least one headlight being provided with said reflector and said light source, said at least one light being provided with an additional reflector having an additional light source and being of one piece with said housing.

6. An illumination device as defined in claim 5, wherein said additional reflector of said light is arranged in a lateral edge region of said housing.

7. An illumination device as defined in claim 5, wherein said additional reflector with said additional light source for said light is located in said inner chamber.

8. An illumination device as defined in claim 5, wherein said cover member is colorless; and further comprising a color filter arranged between said additional reflector for said light and said cover member.

9. An illumination device as defined in claim 5, wherein said cover member has a region through which a light reflected from said additional reflector passes, said region of said additional reflector being colored in a signal color.

10. A vehicle, comprising a front part provided with a tubular receptacle; and an illumination device having and a cover member a cup-shaped housing, at least one reflector provided with at least one light source and supported by said housing, said cover member and said housing of said illumination device and said tubular receptacle of said front part of the vehicle together forming a closed inner chamber in which said at least one reflector with said at least one light source is arranged, said illumination device being mounted on said tubular receptacle of said front part of the vehicle by mounting said cover member in a front region of said receptacle and mounting said housing in a rear region of said receptacle rearwardly spaced from said front region.

* * * * *